US010767682B2

(12) United States Patent
Leon et al.

(10) Patent No.: US 10,767,682 B2
(45) Date of Patent: Sep. 8, 2020

(54) FRANGIBLE FASTENERS WITH FLEXIBLE CONNECTORS FOR UNMANNED AIRCRAFT, AND ASSOCIATED SYSTEMS AND METHODS

(71) Applicant: Insitu, Inc., Bingen, WA (US)

(72) Inventors: Michael Matthew Leon, Washougal, WA (US); Kristian Rubesh, Bingen, WA (US)

(73) Assignee: INSITU, INC., Bingen, WA (US)

( * ) Notice: Subject to any disclaimer, the term of this patent is extended or adjusted under 35 U.S.C. 154(b) by 350 days.

(21) Appl. No.: 15/638,137

(22) Filed: Jun. 29, 2017

(65) Prior Publication Data

US 2019/0003511 A1    Jan. 3, 2019

(51) Int. Cl.
| | | |
|---|---|---|
| *F16B 31/02* | (2006.01) | |
| *F16B 41/00* | (2006.01) | |
| *B64C 23/06* | (2006.01) | |
| *B64C 1/26* | (2006.01) | |

(52) U.S. Cl.
CPC ......... *F16B 31/021* (2013.01); *B64C 23/069* (2017.05); *F16B 41/002* (2013.01); *B64C 1/26* (2013.01); *B64C 2201/021* (2013.01); *B64C 2201/104* (2013.01); *Y10T 403/11* (2015.01)

(58) Field of Classification Search
CPC ...... F16B 31/00; F16B 31/021; F16B 41/002; Y10T 403/11
USPC .............................. 411/2, 3, 5, 383; 470/8, 9
See application file for complete search history.

(56) References Cited

U.S. PATENT DOCUMENTS

| | | | |
|---|---|---|---|
| 965,881 A | 8/1910 | Draper | |
| 968,339 A | 8/1910 | Geraldson | |
| 975,953 A | 11/1910 | Hourwich | |
| 1,144,505 A | 6/1915 | Steffan | |

(Continued)

FOREIGN PATENT DOCUMENTS

| | | |
|---|---|---|
| CN | 1032645 A | 5/1989 |
| DE | 4301671 A1 | 7/1993 |

(Continued)

OTHER PUBLICATIONS

European Search Report and Written Opinion for European Patent Application No. 18178796, Applicant: Insitu, Inc., dated Oct. 22, 2018, 9 pages.

(Continued)

*Primary Examiner* — Magdalena Topolski
*Assistant Examiner* — Marisa V Conlon
(74) *Attorney, Agent, or Firm* — Hanley, Flight & Zimmerman, LLC

(57) ABSTRACT

Frangible fasteners with flexible connectors for unmanned aircraft, and associated systems and methods are disclosed. A representative aircraft includes a fuselage portion, a wing portion, a winglet carried by the wing portion, and a frangible fastener coupling the winglet portion to the wing portion. The frangible fastener can include an outer body with a first portion in contact with the wing portion, a second portion in contact with the winglet portion, and a frangible portion between the first and second portions. A flexible member is positioned at least partially within the outer body and is connected to the first portion so as to extend through and out of the second portion. A stop element is carried by the flexible member.

33 Claims, 11 Drawing Sheets

(56) References Cited

U.S. PATENT DOCUMENTS

| | | | |
|---|---|---|---|
| 1,164,967 A | 12/1915 | Thorp | |
| 1,317,631 A | 9/1919 | Kinser | |
| 1,383,595 A | 7/1921 | Black | |
| 1,384,036 A | 7/1921 | Anderson | |
| 1,428,163 A | 9/1922 | Harriss | |
| 1,499,472 A | 7/1924 | Hazen | |
| 1,530,010 A | 3/1925 | Neilson | |
| 1,532,736 A | 4/1925 | Dodds | |
| 1,556,348 A | 10/1925 | Ray et al. | |
| 1,624,188 A | 4/1927 | Simon | |
| RE16,613 E | 5/1927 | Moody et al. | |
| 1,634,964 A | 7/1927 | Steinmetz | |
| 1,680,473 A | 8/1928 | Parker | |
| 1,686,298 A | 10/1928 | Uhl | |
| 1,712,164 A | 5/1929 | Peppin | |
| 1,716,670 A | 6/1929 | Sperry | |
| 1,731,091 A | 10/1929 | Belleville | |
| 1,737,483 A | 11/1929 | Verret | |
| 1,738,261 A | 12/1929 | Perkins | |
| 1,748,663 A | 2/1930 | Tucker | |
| 1,749,769 A | 3/1930 | Johnson | |
| 1,756,747 A | 4/1930 | Holland | |
| 1,777,167 A | 9/1930 | Forbes | |
| 1,816,976 A | 8/1931 | Kirkham | |
| 1,825,578 A | 9/1931 | Cernuda | |
| 1,836,010 A | 12/1931 | Audrain | |
| 1,842,432 A | 1/1932 | Stanton | |
| 1,869,506 A | 8/1932 | Richardson | |
| 1,892,357 A | 12/1932 | Moe | |
| 1,909,445 A | 5/1933 | Ahola | |
| 1,912,723 A | 6/1933 | Perkins | |
| 1,925,212 A | 9/1933 | Steiber | |
| 1,940,030 A | 12/1933 | Steiber | |
| 1,960,264 A | 5/1934 | Heinkel | |
| 2,211,089 A | 8/1940 | Berlin | |
| 2,286,381 A | 6/1942 | Rubissow | |
| 2,296,988 A | 9/1942 | Endter | |
| 2,333,559 A | 11/1943 | Grady et al. | |
| 2,342,773 A | 2/1944 | Wellman | |
| 2,347,561 A | 4/1944 | Howard et al. | |
| 2,360,220 A | 10/1944 | Goldman | |
| 2,364,527 A | 12/1944 | Haygood | |
| 2,365,778 A | 12/1944 | Schwab | |
| 2,365,827 A | 12/1944 | Liebert | |
| 2,380,702 A | 7/1945 | Persons | |
| 2,390,754 A | 12/1945 | Valdene | |
| 2,401,853 A | 6/1946 | Bailey | |
| 2,435,197 A | 2/1948 | Brodie | |
| 2,436,240 A | 2/1948 | Wiertz | |
| 2,447,945 A | 8/1948 | Knowler | |
| 2,448,209 A | 8/1948 | Boyer et al. | |
| 2,465,936 A | 3/1949 | Schultz | |
| 2,488,050 A | 11/1949 | Brodie | |
| 2,488,051 A | 11/1949 | Brodie | |
| 2,515,205 A | 7/1950 | Fieux | |
| 2,526,348 A | 10/1950 | Gouge | |
| 2,669,403 A | 2/1954 | Milligan | |
| 2,671,938 A | 3/1954 | Roberts | |
| 2,735,391 A | 2/1956 | Buschers | |
| 2,747,454 A * | 5/1956 | Bowersett | F16B 31/021 411/8 |
| 2,787,185 A | 4/1957 | Rea et al. | |
| 2,814,453 A | 11/1957 | Trimble et al. | |
| 2,843,342 A | 7/1958 | Ward | |
| 2,844,340 A | 7/1958 | Daniels et al. | |
| 2,908,240 A | 10/1959 | Hodge | |
| 2,919,871 A | 1/1960 | Sorensen | |
| 2,933,183 A | 4/1960 | Koelsch | |
| 2,937,827 A | 5/1960 | Duce | |
| 2,954,946 A | 10/1960 | O'Neil et al. | |
| 3,069,118 A | 12/1962 | Bernard | |
| RE25,406 E | 6/1963 | Byrne et al. | |
| 3,163,380 A | 12/1964 | Brodie | |
| 3,268,090 A | 8/1966 | Wirkkala | |
| 3,411,398 A | 11/1968 | Blakeley et al. | |
| 3,454,244 A | 7/1969 | Walander | |
| 3,468,500 A | 9/1969 | Carlsson | |
| 3,484,061 A | 12/1969 | Niemkiewicz | |
| 3,512,447 A | 5/1970 | Vaughn | |
| 3,516,626 A | 6/1970 | Strance et al. | |
| 3,589,651 A | 6/1971 | Niemkiewicz et al. | |
| 3,657,956 A | 4/1972 | Bradley et al. | |
| 3,672,214 A | 6/1972 | Yasuda | |
| 3,684,219 A | 8/1972 | King | |
| 3,708,200 A | 1/1973 | Richards | |
| 3,765,625 A | 10/1973 | Myhr et al. | |
| 3,771,484 A | 11/1973 | Schott et al. | |
| 3,827,660 A | 8/1974 | Doolittle | |
| 3,939,988 A | 2/1976 | Wellman et al. | |
| 3,943,657 A | 3/1976 | Leckie et al. | |
| 3,980,259 A | 9/1976 | Greenhalgh et al. | |
| 4,037,807 A | 7/1977 | Johnston | |
| 4,067,139 A | 1/1978 | Pinkerton et al. | |
| 4,079,901 A | 3/1978 | Mayhew et al. | |
| 4,143,840 A | 3/1979 | Bernard et al. | |
| 4,149,840 A | 3/1979 | Tippmann | |
| 4,147,317 A | 4/1979 | Mayhew et al. | |
| D256,816 S | 9/1980 | McMahon et al. | |
| 4,236,686 A | 12/1980 | Barthelme et al. | |
| 4,238,093 A | 12/1980 | Siegel et al. | |
| 4,267,987 A | 5/1981 | McDonnell | |
| 4,279,195 A | 7/1981 | Miller | |
| 4,296,894 A | 10/1981 | Schnabele et al. | |
| 4,296,898 A | 10/1981 | Watson | |
| 4,311,290 A | 1/1982 | Koper | |
| 4,372,016 A | 2/1983 | LaViolette et al. | |
| 4,408,737 A | 10/1983 | Schwaerzler et al. | |
| 4,410,151 A | 10/1983 | Hoppner et al. | |
| 4,457,479 A | 7/1984 | Daude et al. | |
| 4,471,923 A | 9/1984 | Hoppner et al. | |
| 4,523,729 A | 6/1985 | Frick et al. | |
| 4,566,658 A | 1/1986 | DiGiovanniantonio et al. | |
| 4,618,291 A * | 10/1986 | Wright | B25B 13/065 405/259.2 |
| 4,645,142 A | 2/1987 | Soelter | |
| 4,653,706 A | 3/1987 | Ragiab | |
| 4,678,143 A | 7/1987 | Griffin et al. | |
| 4,720,204 A * | 1/1988 | Johnson | E04H 12/32 285/2 |
| 4,730,793 A | 3/1988 | Thurber, Jr. et al. | |
| 4,753,400 A | 6/1988 | Reuter et al. | |
| 4,790,497 A | 12/1988 | Yoffe et al. | |
| 4,809,933 A | 3/1989 | Buzby et al. | |
| 4,842,222 A | 6/1989 | Baird et al. | |
| 4,909,458 A | 3/1990 | Martin et al. | |
| 4,979,701 A | 12/1990 | Colarik et al. | |
| 4,991,739 A | 2/1991 | Levasseur | |
| 5,007,875 A | 4/1991 | Dasa | |
| 5,039,034 A | 8/1991 | Burgess et al. | |
| 5,042,750 A | 8/1991 | Winter | |
| 5,054,717 A | 10/1991 | Taylor et al. | |
| 5,060,888 A | 10/1991 | Vezain et al. | |
| 5,109,788 A | 5/1992 | Heinzmann et al. | |
| 5,119,935 A | 6/1992 | Stump et al. | |
| 5,145,129 A | 9/1992 | Gebhard | |
| 5,169,400 A * | 12/1992 | Muhling | A61B 17/86 411/395 |
| 5,176,339 A | 1/1993 | Schmidt | |
| 5,222,694 A | 6/1993 | Smoot | |
| 5,253,605 A | 10/1993 | Collins | |
| 5,253,606 A | 10/1993 | Ortelli et al. | |
| 5,259,574 A | 11/1993 | Carrot | |
| 5,378,851 A | 1/1995 | Brooke et al. | |
| 5,390,550 A | 2/1995 | Miller | |
| 5,407,153 A | 4/1995 | Kirk et al. | |
| 5,415,507 A * | 5/1995 | Janusz | E04G 23/0222 411/383 |
| 5,509,624 A | 4/1996 | Takahashi et al. | |
| 5,583,311 A | 12/1996 | Rieger et al. | |
| 5,603,592 A | 2/1997 | Sadri et al. | |
| 5,655,944 A | 8/1997 | Fusselman | |
| 5,687,930 A | 11/1997 | Wagner et al. | |
| 5,702,214 A * | 12/1997 | Duran | F16B 5/02 411/24 |

(56) References Cited

U.S. PATENT DOCUMENTS

| | | | |
|---|---|---|---|
| 5,762,456 A | 6/1998 | Aasgaard | |
| 5,816,761 A | 10/1998 | Cassatt et al. | |
| 5,906,336 A | 5/1999 | Eckstein | |
| 5,913,479 A | 6/1999 | Westwood, III | |
| 5,928,236 A * | 7/1999 | Augagneur | A61B 17/8605 411/405 |
| 6,056,471 A * | 5/2000 | Dinitz | E01F 9/681 403/2 |
| 6,161,797 A | 12/2000 | Kirk et al. | |
| 6,237,875 B1 | 5/2001 | Menne et al. | |
| 6,264,140 B1 | 7/2001 | McGeer et al. | |
| 6,343,768 B1 | 2/2002 | Muldoon et al. | |
| 6,370,455 B1 | 4/2002 | Larson et al. | |
| 6,371,410 B1 | 4/2002 | Cairo-Iocco et al. | |
| 6,416,019 B1 | 7/2002 | Hilliard et al. | |
| 6,442,460 B1 | 8/2002 | Larson et al. | |
| 6,457,673 B1 | 10/2002 | Miller | |
| 6,478,650 B1 | 11/2002 | Tsai et al. | |
| 6,604,882 B2 * | 8/2003 | Gordon | F16G 11/00 24/122.6 |
| 6,623,492 B1 * | 9/2003 | Berube | A61B 17/0642 411/2 |
| 6,626,077 B1 | 9/2003 | Gilbert | |
| 6,662,511 B1 * | 12/2003 | Alty | E04F 13/0837 411/178 |
| 6,695,255 B1 | 2/2004 | Husain | |
| 6,758,440 B1 | 7/2004 | Repp et al. | |
| 6,772,488 B1 | 8/2004 | Jensen et al. | |
| 6,835,045 B1 | 12/2004 | Barbee et al. | |
| 6,874,729 B1 | 4/2005 | McDonnell | |
| 6,925,690 B2 | 8/2005 | Sievers | |
| 6,939,073 B1 * | 9/2005 | Ahmed | F16B 31/00 403/2 |
| 7,114,680 B2 | 2/2006 | Dennis | |
| 7,044,688 B2 * | 5/2006 | Dever | E21D 20/025 405/259.1 |
| 7,059,564 B2 | 6/2006 | Dennis | |
| 7,066,430 B2 | 6/2006 | Dennis et al. | |
| 7,090,166 B2 | 8/2006 | Dennis et al. | |
| 7,121,507 B2 | 10/2006 | Dennis et al. | |
| 7,128,294 B2 | 10/2006 | Roeseler et al. | |
| 7,140,575 B2 | 11/2006 | McGeer et al. | |
| 7,143,974 B2 | 12/2006 | Roeseler et al. | |
| 7,152,827 B2 | 12/2006 | McGeer | |
| 7,155,322 B2 | 12/2006 | Nakahara et al. | |
| 7,165,745 B2 | 1/2007 | McGeer et al. | |
| 7,175,135 B2 | 2/2007 | Dennis et al. | |
| 7,219,856 B2 | 5/2007 | Watts et al. | |
| 7,259,357 B2 | 8/2007 | Walker | |
| 7,264,204 B1 | 9/2007 | Portmann | |
| 7,410,125 B2 | 8/2008 | Steele | |
| 7,422,178 B2 | 9/2008 | DeLaune | |
| 7,472,461 B2 | 1/2009 | Anstee | |
| 7,510,145 B2 | 3/2009 | Snediker | |
| 7,578,467 B2 | 8/2009 | Goodrich | |
| 7,686,247 B1 | 3/2010 | Monson et al. | |
| 7,740,210 B2 | 6/2010 | Pilon et al. | |
| 7,748,661 B2 | 7/2010 | Harris et al. | |
| 7,798,445 B2 | 9/2010 | Heppe et al. | |
| 7,806,366 B2 | 10/2010 | Jackson | |
| 8,016,073 B2 | 9/2011 | Petzel | |
| 8,028,952 B2 | 10/2011 | Urnes, Sr. | |
| 8,038,090 B2 | 10/2011 | Wilson | |
| 8,136,766 B2 | 3/2012 | Dennis | |
| 8,172,177 B2 | 5/2012 | Lovell et al. | |
| 8,205,537 B1 | 6/2012 | Dupont | |
| 8,313,057 B2 | 11/2012 | Rednikov | |
| 8,348,714 B2 | 1/2013 | Newton | |
| 8,387,540 B2 | 3/2013 | Merems | |
| 8,398,345 B2 * | 3/2013 | Pratt | F16B 13/0858 411/34 |
| 8,683,770 B2 | 4/2014 | diGirolamo et al. | |
| 8,820,698 B2 | 9/2014 | Balfour et al. | |
| 8,944,373 B2 | 2/2015 | Dickson et al. | |
| 8,950,124 B2 | 2/2015 | Wellershoff | |
| 9,085,362 B1 | 7/2015 | Kilian et al. | |
| 9,340,301 B2 | 5/2016 | Dickson et al. | |
| 9,359,075 B1 | 6/2016 | von Flotow et al. | |
| 9,512,868 B2 * | 12/2016 | Stempniewski | F16B 13/065 |
| 9,932,110 B2 | 4/2018 | McNally | |
| 2002/0011223 A1 | 1/2002 | Zauner et al. | |
| 2002/0049447 A1 | 4/2002 | Li | |
| 2002/0100838 A1 | 8/2002 | McGeer et al. | |
| 2003/0116107 A1 | 6/2003 | Laimbock | |
| 2003/0122384 A1 | 7/2003 | Swanson et al. | |
| 2003/0202861 A1 | 10/2003 | Nelson | |
| 2003/0222173 A1 | 12/2003 | McGeer et al. | |
| 2004/0129833 A1 | 7/2004 | Perlo et al. | |
| 2005/0008449 A1 * | 1/2005 | Horita | E06B 1/6076 411/383 |
| 2005/0132923 A1 | 6/2005 | Lloyd | |
| 2005/0187677 A1 | 8/2005 | Walker | |
| 2006/0006281 A1 | 1/2006 | Sirkis | |
| 2006/0091258 A1 | 5/2006 | Chiu et al. | |
| 2006/0102783 A1 | 5/2006 | Dennis et al. | |
| 2006/0249623 A1 | 11/2006 | Steele | |
| 2006/0271251 A1 | 11/2006 | Hopkins | |
| 2007/0023582 A1 | 2/2007 | Steele et al. | |
| 2007/0158498 A1 | 7/2007 | Snediker | |
| 2007/0200027 A1 | 8/2007 | Johnson | |
| 2007/0261542 A1 | 11/2007 | Chang et al. | |
| 2008/0156932 A1 | 7/2008 | McGeer et al. | |
| 2008/0191091 A1 | 8/2008 | Hoisington et al. | |
| 2009/0114761 A1 | 5/2009 | Sells | |
| 2009/0136294 A1 * | 5/2009 | Porter | B64C 1/06 403/408.1 |
| 2009/0191019 A1 | 7/2009 | Billings | |
| 2009/0194638 A1 | 8/2009 | Dennis | |
| 2009/0224097 A1 | 9/2009 | Kariv | |
| 2009/0236470 A1 | 9/2009 | Goossen | |
| 2009/0294584 A1 | 12/2009 | Lovell et al. | |
| 2010/0181424 A1 | 7/2010 | Goossen | |
| 2010/0237183 A1 | 9/2010 | Wilson et al. | |
| 2010/0243799 A1 | 9/2010 | Al-Qaffas | |
| 2010/0318475 A1 | 12/2010 | Abrahamson | |
| 2012/0210853 A1 | 8/2012 | Abershitz | |
| 2012/0223182 A1 | 9/2012 | Gilchrist, III | |
| 2013/0082137 A1 | 4/2013 | Gundlach et al. | |
| 2015/0129716 A1 | 5/2015 | Yoffe | |
| 2015/0166177 A1 | 6/2015 | Bernhardt | |
| 2016/0114906 A1 | 4/2016 | McGeer et al. | |
| 2016/0137311 A1 | 5/2016 | Peverill et al. | |
| 2016/0144980 A1 | 5/2016 | Kunz et al. | |
| 2016/0152339 A1 | 6/2016 | von Flowtow | |
| 2016/0264259 A1 | 9/2016 | Dickson et al. | |
| 2016/0327945 A1 | 11/2016 | Davidson | |
| 2016/0375981 A1 | 12/2016 | McDonnell | |
| 2017/0191269 A1 * | 7/2017 | Tsukamoto | F16B 37/00 |
| 2017/0225784 A1 | 8/2017 | Kunz et al. | |
| 2017/0369185 A1 | 12/2017 | Grub | |
| 2018/0001990 A1 * | 1/2018 | Kossar | B64C 1/36 |
| 2018/0162528 A1 | 6/2018 | McGrew et al. | |

FOREIGN PATENT DOCUMENTS

| | | |
|---|---|---|
| DE | 19602703 A1 | 2/1997 |
| EP | 0742366 A1 | 11/1996 |
| FR | 854371 | 4/1940 |
| GB | 1445153 | 8/1976 |
| GB | 2 080 216 A | 2/1982 |
| GB | 2093414 A | 9/1982 |
| GB | 2 150 895 A | 7/1985 |
| GB | 2 219 777 A | 12/1989 |
| GB | 2231011 A | 11/1990 |
| IL | 76726 | 1/1991 |
| JP | 07-304498 | 11/1995 |
| JP | 2008540217 A | 11/2008 |
| WO | WO-00/75014 A1 | 12/2000 |
| WO | WO-01/07318 A1 | 2/2001 |
| WO | WO-2008015663 A1 | 2/2008 |

(56) References Cited

FOREIGN PATENT DOCUMENTS

| WO | WO-2011066400 | 6/2011 |
|----|---------------|--------|
| WO | WO-2012047677 | 4/2012 |
| WO | WO-2014080386 | 5/2014 |

OTHER PUBLICATIONS

Ames Builds Advanced Yawed-Wing RPV, Aviation Week and Space Technology, Jan. 22, 1973, p. 73.

Article: Stephen A. Whitmore, Mike Fife, and ; Logan Brashear: "Development of a Closed-Loop Strap Down Attitude System for an Ultrahigh Altitude Flight Experiment," Jan. 1997, NASA Technical Memorandum 4775.

Article: Robinson: R. Robinson, "Dynamic Analysis of a Carousel Remotely Piloted Vehicle Recovery System," 1977, Naval ; Post-Graduate School Master's Thesis, No. ADA052401.

Galinski et al., "Results of the Gust Resistant MAV Programme," 28th International Congress of the Aeronautical Sciences, 2012, 10 pages.

Gross, Jon L., Investigation of Lift, Drag, and; Aerodynamic Pitching Moment During In-Flight Recovery of a Remotely Piloted Vehicle, Air Force Institute of Technology, NTIS, ; Sep. 1973, 99 pages.

Hunton, Lynn W. and James, Harry A., NACA Research Memorandum for the Air Material Command, U.S. Air Force, "An Investigation of the McDonnell XP-85 Airplane in the Ames 40 by 80 Foot Wind Tunnel—Force and Moment Tests," National Advisory Committee for Aeronautics, Sep. 27, 1948, 155 pages.

Phillips, K.; "Alternate Aquila Recovery System Demonstration Recovery System Flight Test;" Final Report; Jan. 19, 1977; 67 pages.

Plane Talk, The Newsletter of the War Eagles Air Museum, www.war-eagles-air-museum.com; vol. 25, No. 1, First Quarter Jan.-Mar. 2012, 8 pages.

Study: US Army: H. E. Dickard, "Mini-RPV Recovery System Conceptual Study," Aug. 1977, Contract DA4J02-76-C-0048, Report No. USAAMRDL-TR077-24.

Dorr, Robert F., "The XF-85 Goblin," http://www.defensemedianetwork.com/stories/the-xf-85-goblin-the-parasite-fighter-that-didnt-work/, DefenseMediaNetwork, Sep. 11, 2014.

European Patent Office, "Communication pursuant to Article 94(3) EPC," issued in connection with European Patent Application No. 18 178 7961, dated Jun. 24, 2020, 4 pages.

\* cited by examiner

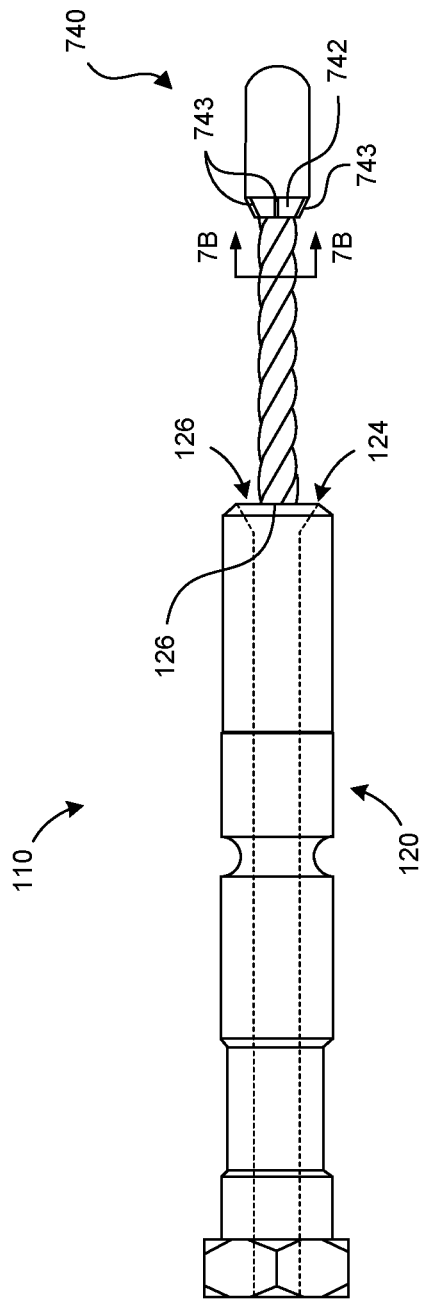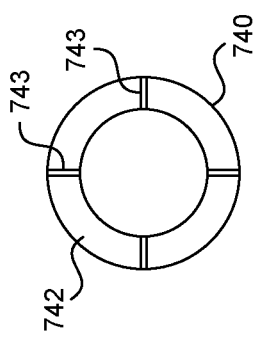

FRANGIBLE FASTENERS WITH FLEXIBLE CONNECTORS FOR UNMANNED AIRCRAFT, AND ASSOCIATED SYSTEMS AND METHODS

TECHNICAL FIELD

The present technology is directed generally to frangible fasteners with flexible connectors for unmanned aircraft, and associated systems and methods.

BACKGROUND

Frangible fasteners are commonly used in unmanned aircraft or air vehicles (UAVs) to secure various components (e.g., fuselage, wings, winglets, empennage, etc.) of the aircraft together. Frangible fasteners can help minimize damage to the aircraft during landing and/or other high-impact operations. For example, many conventional unmanned aircraft include wings connected to the fuselage with frangible (e.g., plastic) screws. If the aircraft crashes or is subjected to a high-impact load, the plastic screws break, thereby allowing the wings to completely separate from the fuselage. This arrangement often results in less damage to the wings and fuselage as compared to configurations in which the wings are rigidly connected to the fuselage.

One concern with this arrangement, however, is that in many cases it may be undesirable to allow many of the relatively expensive, delicate components of the aircraft to break free from the aircraft during operation. These components can be seriously damaged and/or destroyed after detachment from the aircraft. Another concern with this arrangement is that when such components break completely free from the aircraft, the electrical connections or other system connections between the aircraft and the respective component are completely broken. Repairing these connections can be extremely expensive and time-consuming.

BRIEF DESCRIPTION OF THE DRAWINGS

FIG. 7A is a partially schematic, side elevation view of a frangible fastener having a stop element configured in accordance with some embodiments of the present technology.

FIG. 7B is a partially schematic, cross-sectional illustration of an embodiment of a frangible fastener taken substantially along line 7B-7B of FIG. 7A.

DETAILED DESCRIPTION

The present technology is directed generally to frangible fasteners with flexible connectors for unmanned aircraft, and associated systems and methods. In particular embodiments, the frangible fastener is installed on an unmanned aircraft having a fuselage, a wing, and a winglet carried by the wing. The frangible fastener can couple the winglet to the wing, and can include an outer body with a first portion in contact with the wing, a second portion in contact with the winglet, and a frangible portion between the first and second portions. The frangible fastener can further include a flexible member positioned at least partially within the outer body and connected to the first portion. The flexible member can extend through and out of the second portion, and can carry a stop element. In operation, when the wing or winglet is subjected to a load above a threshold load, the frangible fastener breaks at the frangible portion, allowing the winglet to move away from the wing, but in a manner constrained by the flexible member. As will be described in further detail below, the flexible member can provide advantages over existing devices that include frangible fasteners with more rigid connections.

Many specific details of certain embodiments of the disclosure are set forth in the following description and in FIGS. 1-9 to provide a thorough understanding of these embodiments. Well-known structures, systems, and methods often associated with such systems have not been shown or described in detail to avoid unnecessarily obscuring the description of the various embodiments of the disclosure. In addition, those of ordinary skill in the relevant art will understand that additional embodiments may be practiced without several of the details described below.

Figure 1:
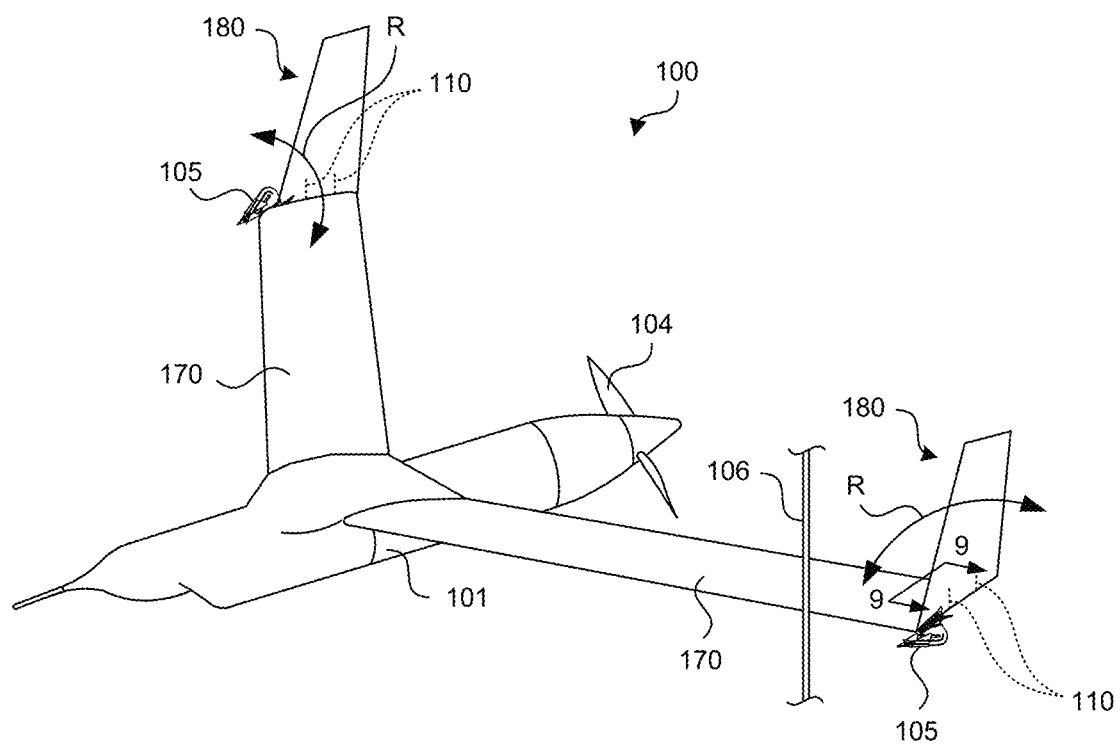
FIG. 1 is a partially schematic, isometric illustration of an unmanned aircraft having one or more components coupled with frangible fasteners or links configured in accordance with embodiments of the present technology.

FIG. 1 is a partially schematic, isometric illustration of an unmanned aircraft 100 having one or more components coupled with frangible fasteners or links configured in accordance with some embodiments of the present technology. The unmanned aircraft 100 can include a fuselage (or a fuselage portion) 101, a pair of wings (or wing portions) 170 extending outwardly from the fuselage 101, and a propeller 104 positioned at the aft end of the fuselage 101 to propel the aircraft 100 during flight. Each wing 170 can include an upwardly extending winglet (or winglet portion) 180 for lateral stability and control. Each wing 170 can also include a capture device 105 (e.g., a hook or wing hook). After completing a mission, the aircraft 100 is "captured" in flight by flying the wing 170 into a capture line 106 or other elongated fixture. The capture device 105 engages the capture line 106, bringing the aircraft 100 to rest. In the illustrated embodiment, the winglets 180 are partially removable elements releasably coupled to the corresponding wings 170 with one or more frangible fasteners or links 110 (shown schematically). Although each winglet 180 is shown in FIG. 1 attached with two frangible fasteners 110, it will be appreciated that a different number of fasteners 110 may be used in some embodiments. Furthermore, the frangible fasteners 110 may be used throughout the aircraft 100 to couple any of a variety of suitable different components together.

As described in detail below, the frangible fasteners 110 are fasteners that will readily break when a threshold force (e.g., a force above a predetermined level) is applied to the winglet 180 and/or the wing 170, e.g., during the capture operation described above. Such a force may cause the winglet 180 to rotate toward and away from the wing 170 (as indicated by arrows R in FIG. 1), and/or twist, rotate and/or translate in other directions. The frangible fasteners 110 in the illustrated embodiment, however, do not completely break. Rather, the frangible fasteners 110 include two discrete members that can move relative to each other by up to a fixed distance while remaining coupled to each other. Compared with conventional frangible fasteners that completely break when subjected to a force, the frangible fasteners 110 are expected to prevent components of the aircraft (e.g., the winglets 180) from breaking completely away from the aircraft 100 and contacting the ground or other structures. In addition, by not completely breaking apart, the frangible fasteners 110 are expected to prevent damage and/or destruction of the electrical (or other system) connections between the wing 170 and a respective winglet 180 if the winglet 180 breaks away from the aircraft 100. Further details regarding the frangible fasteners 110 are described further below with reference to FIGS. 2A-9.

Figure 2A:
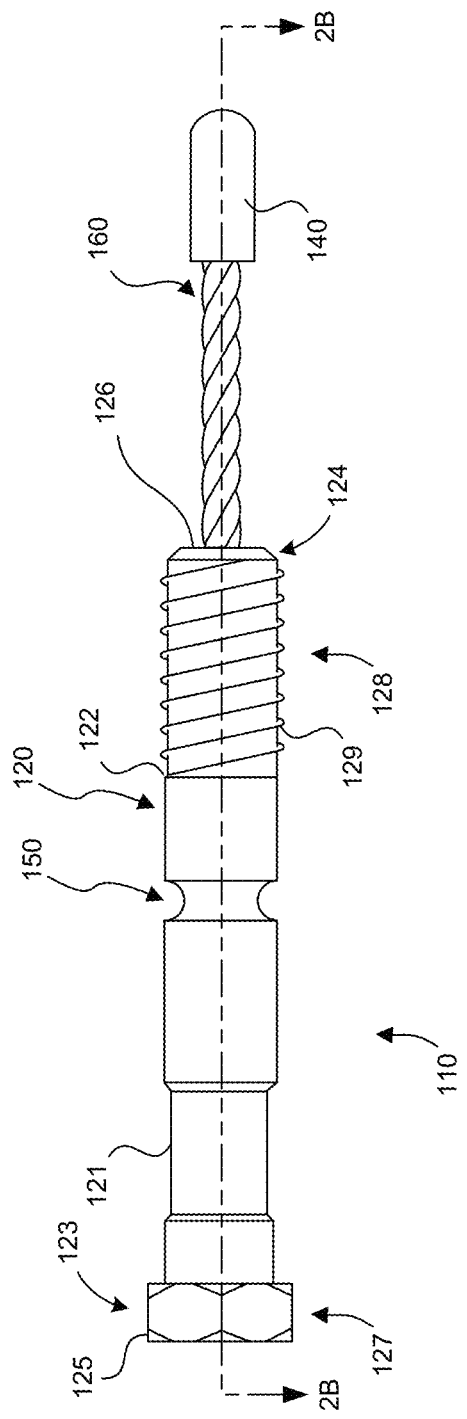
FIG. 2A is a partially schematic, side elevation view of a fastener having a flexible member configured in accordance with an embodiment of the present technology.

FIG. 2A is a partially schematic side elevation view of a representative frangible fastener 110, configured in accordance with embodiments of the present technology. The frangible fastener 110 can include an outer body 120 having a first portion 121, a second portion 122, and a frangible portion 150 between the first and second portions 121, 122. The outer body 120 can have a hollow internal cavity with an opening 126 from which a flexible member 160 extends. The flexible member 160 can carry a stop element 140. The frangible fastener 110 can be connected between two components and, when it breaks at the frangible portion 150, the stop member 140 can prevent the two components from moving apart from each other by more than the length of the flexible member 160.

The outer body 120 can include a first end 123 (e.g., at the first portion 121) having a first attachment element 127, and a second end 124 (e.g., at the second portion 122) having a second attachment element 128. The first attachment element 127 can include a head 125 (e.g., a hexagonal bolt head) that contacts one component, and the second attachment element 128 can include external threads 129 that contact another component.

Figure 2B:
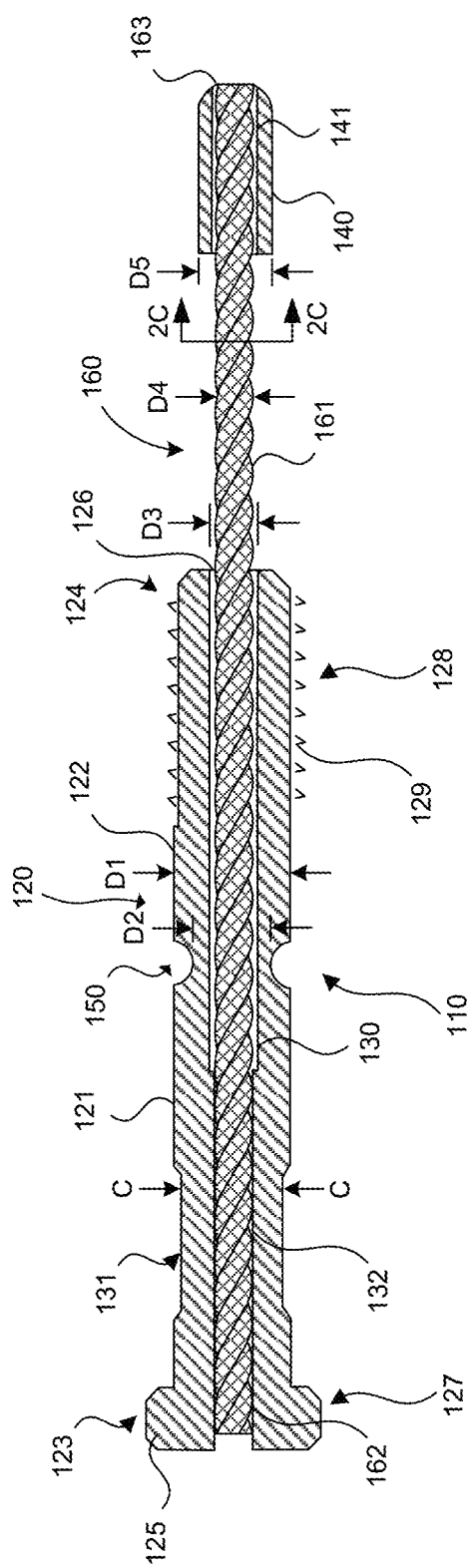
FIG. 2B is a partially schematic, side cross-sectional illustration of an embodiment of the frangible fastener taken substantially along line 2B-2B of FIG. 2A.

FIG. 2B is a partially schematic, cross-sectional illustration of an embodiment of the frangible fastener shown in FIG. 2A. FIG. 2B illustrates the internal cavity 130 of the outer body 120 from which the flexible member 160 extends. The flexible member 160 can be fixedly attached to the first portion 121 for example, at a crimp region 131. To fasten the flexible member 160 to the first portion, the first portion 121 is crimped at the crimp region 131, as indicated by arrows C, forming a crimp joint 132 with the flexible member 160.

The outer body 120 has an outer diameter D1 at the first portion 121 and/or the second portion 122, that is greater than a corresponding diameter D2 at the frangible portion 150. Accordingly, when a bending load is applied to the outer body 120, it will preferentially fracture at the frangible portion 150. The internal cavity 130 has a diameter D3 that is greater than an outer diameter D4 of the flexible member 160. Accordingly, when the frangible portion 150 breaks, the second portion 122 can slide over the flexible member 160 toward the stop element 140. The stop element 140 has an outer diameter D5 that is greater than the inner diameter D3 of the internal cavity 130. Accordingly, the stop element 140 prevents the second portion 122 from moving beyond the stop element 140. The stop element 140 can be fastened to the flexible member 160 at a crimp joint 141 positioned toward a second end 163 of the flexible member 160. A corresponding first end 162 of the flexible member 160 can be recessed from the first end 123 of the outer body 120, or, it may protrude slightly from the first end 123 by virtue of the crimping operation performed at the crimp region 131.

In particular embodiments, the foregoing diameters, and in particular, the concentricity of the foregoing diameters is controlled to provide consistency from one frangible fastener 110 to another. For example, the internal cavity diameter D3 is deliberately kept concentric with the frangible portion diameter D2, as eccentricity between these two diameters may weaken the frangible portion 150.

The flexible member 160 can have any of a variety of suitable configurations. In a particular configuration, the flexible member 160 is formed from a stranded cable 161. It is expected that the cable construction of the flexible member 160 facilitates forming the crimp joint 132, and is expected to allow the flexile member 160 to undergo significant bending (e.g., elastic bending) without breaking. For example, during the crimping operation, material from the outer body 120 can enter the interstices between strands and/or filaments of the cable 161 to further secure the cable 161 to the outer body 120. In addition, the stranded nature of the cable is expected to better resist fracturing than a solid construction. For example, some individual strands may break during operation, without causing the break to extend to other strands and/or causing the flexible member 160 to fail.

Figure 2C:
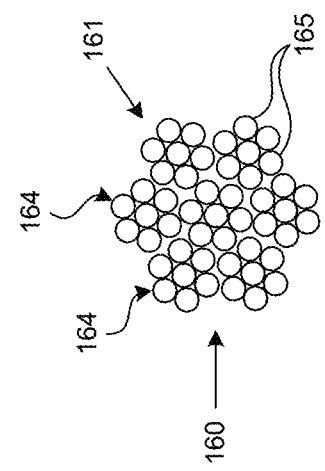
FIG. 2C is a partially schematic, cross-sectional illustration of an embodiment of the frangible fastener taken substantially along line 2C-2C of FIG. 2B.

FIG. 2C is a cross-sectional illustration of a representative cable 161 formed from multiple strands 164, in particular, seven strands 164. Each strand 164 can be formed from multiple (e.g., seven) filaments 165. In other embodiments, the cable 161 can include other suitable numbers of strands 164 and/or other suitable numbers of filaments 165. In still further embodiments, the flexible member 160 can have other constructions, including a solid wire construction, although a stranded construction may provide better fatigue resistance and/or a better connection with the outer body 120, as described above.

Figure 3:
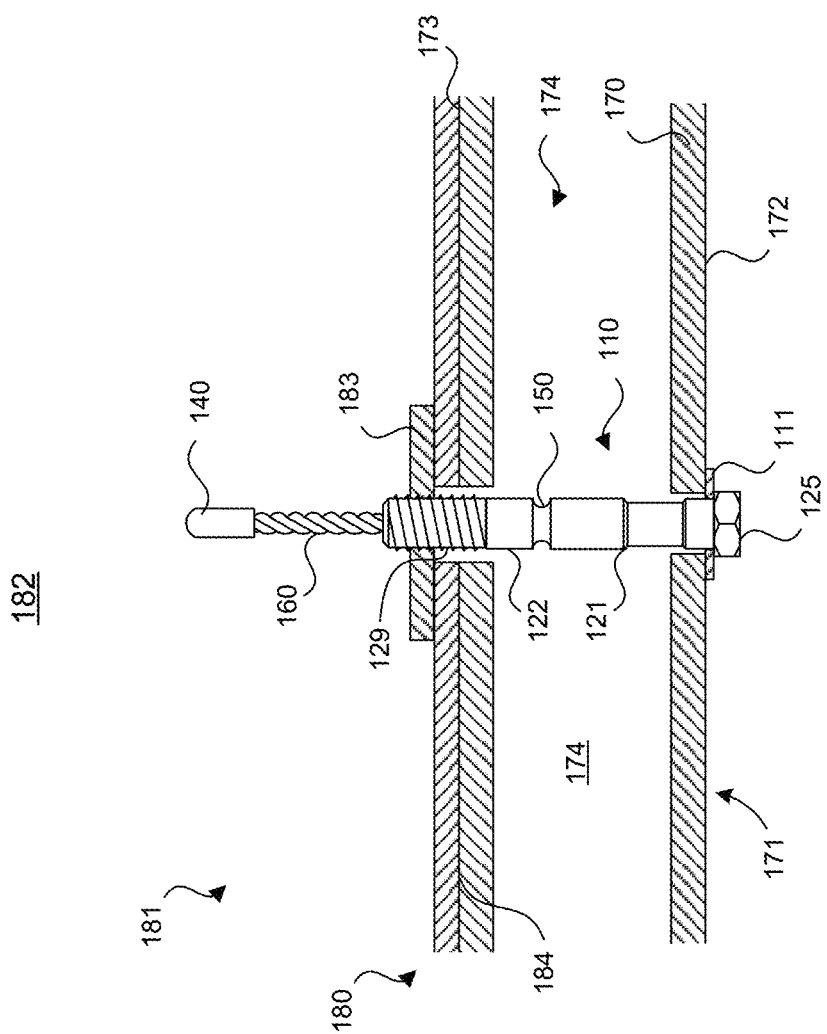
FIG. 3 is a partially schematic, partially cross-sectional illustration of a frangible fastener installation in accordance with embodiments of the present technology.

FIG. 3 schematically illustrates a representative frangible fastener 110 connecting a first component 171 and a second component 181 in accordance with an embodiment of the present technology. The first component 171 can include the wing or wing portion 170 described above, and the second component 181 can include the winglet or winglet portion 180 described above. The wing 170 has a lower surface 172, an upper surface 173, and an interior region 174 in between. The winglet 180 has a lower surface 184 carrying an internally threaded nut plate 183, and an interior region 182. The frangible fastener 110 can be installed with the first portion 121 operably engaged with the wing lower surface 172, e.g., with the head 125 bearing against the wing lower surface 172, or with an intermediate member (such as a washer 111) bearing against the wing lower surface 172 to distribute the load from the fastener 110 to the wing 170. The first portion 121 of the frangible fastener 110 extends into the wing interior 174, and the second portion 122 is threadably engaged with the nut plate 183 of the winglet 180. In some embodiments, the external threads 129 of the second portion 122 are not further bonded to the nut plate 183, e.g., with Loctite® or another chemical agent. This arrangement can facilitate removing the frangible fastener 110, as described later with reference to FIG. 6. Because the installed frangible fastener 110 is under tension, the need for a chemical locking agent can be reduced or eliminated. The flexible member 160 and stop element 140 project into the winglet interior region 182. The stop element 140 is not directly or fixedly connected to the winglet 180 so that when the frangible fastener 110 breaks, the winglet 180 and the stop element 140 can move relative to each other. Upon installation, the head 125 is torqued, e.g., to a specified seating torque which is a specific percentage below the torsional strength of the frangible region, to place the frangible fastener 110 in tension, without overly stressing the frangible portion 150.

Figure 4:
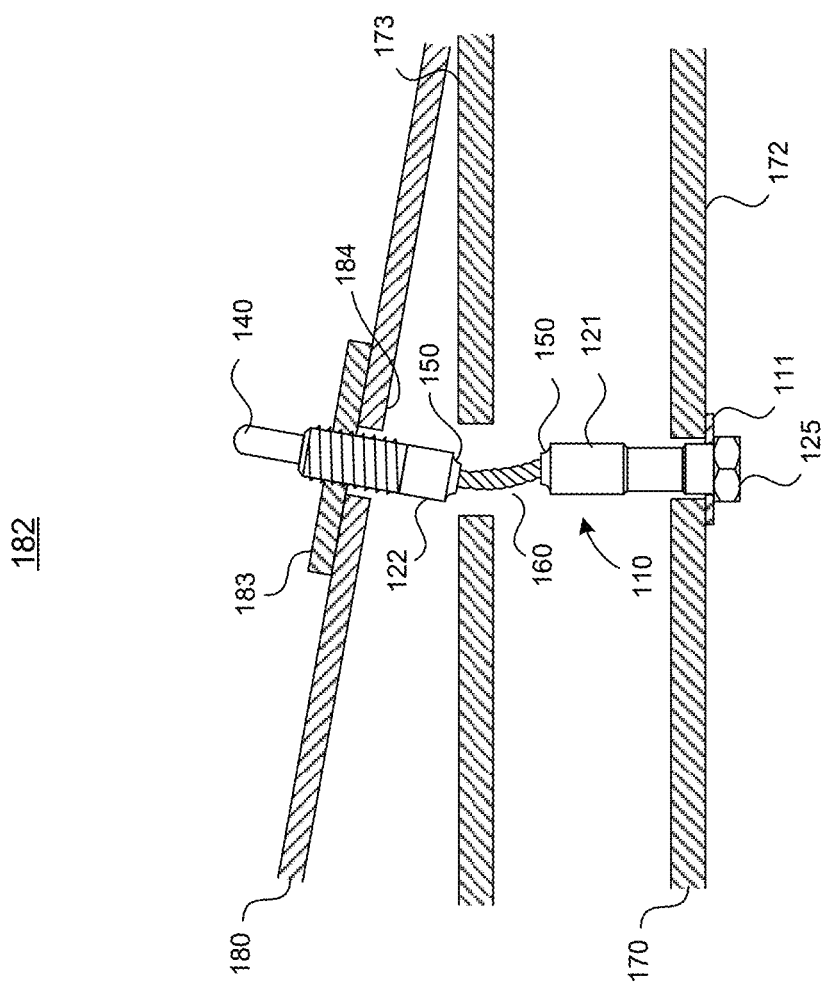
FIG. 4 is a partially schematic, partially cross-sectional illustration of a frangible fastener installation with the frangible fastener broken in accordance with an embodiment of the present technology.
Figure 5:
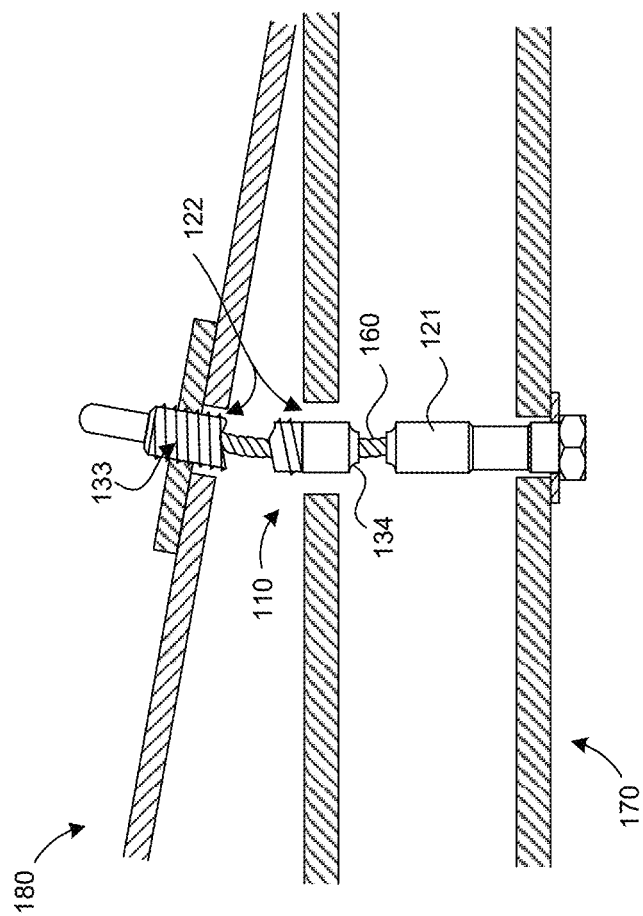
FIG. 5 is a partially schematic, partially cross-sectional illustration of a frangible fastener installation with the frangible fastener broken in two places in accordance with an embodiment of the present technology.

If the joint between the wing 170 and the winglet 180 is subject to a load (e.g., a bending load) greater than a threshold load, the frangible fastener 110 will break at the frangible portion 150, as shown in FIG. 4. Once the frangible fastener 110 breaks, the winglet 180 will move relative to the wing 170, within the constraints provided by the flexible member 160 and the stop element 140. As the winglet 180 moves relative to the wing 170, the flexible member 160 may put a bending load on the projecting second portion 122, which remains threadably attached to the nut plate 183. This in turn may cause the second portion to break, e.g., near the winglet lower surface 184, as shown in FIG. 5. Accordingly, the second portion 122 now includes an attached second portion 133, and a loose second portion 134. The loose second portion 134 can move along the flexible member 160, but is still constrained by the first portion 121 and the attached second portion 133.

Once the unmanned aircraft 100 (FIG. 1) has been brought to rest after capture, the frangible fastener 110 is removed. The first component (e.g., the wing 170) and the second component (e.g., the winglet 180) are inspected, and the second component is reattached to the first component with a new frangible fastener 110.

Figure 6:
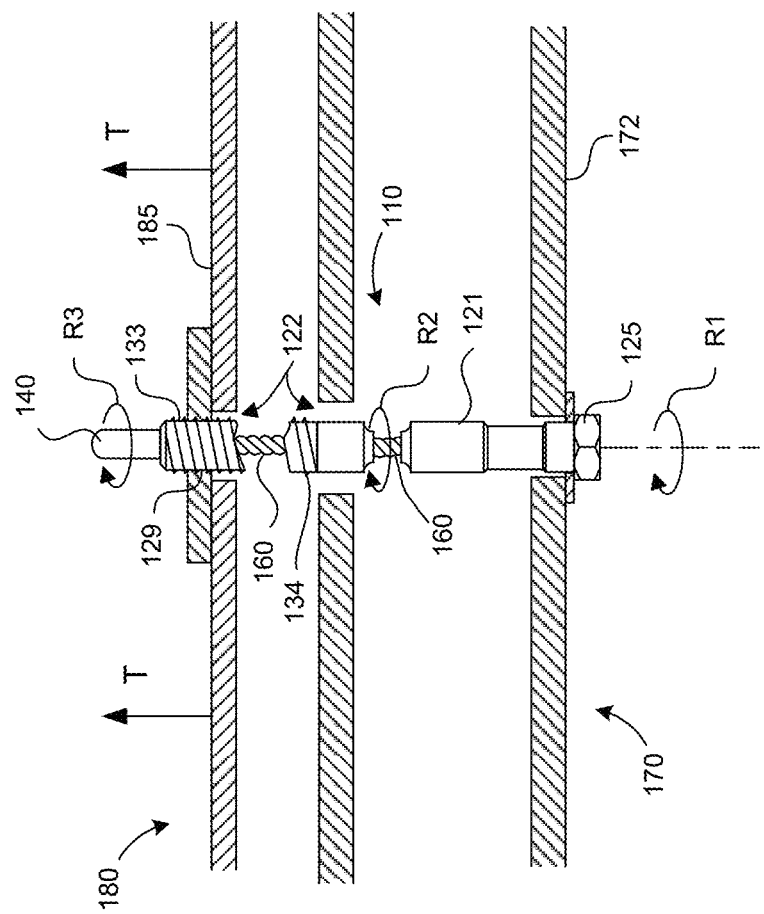
FIG. 6 is a partially schematic, cross-sectional illustration of a process for removing post-break frangible fasteners in accordance with embodiments of the present technology.

FIG. 6 illustrates a representable technique for removing the broken frangible fastener 110. As described above, the external threads 129 are not further secured to the nut plate 183 with a chemical agent but are simply threaded. Accordingly, the frangible fastener 110 can be removed by unthreading it from the winglet 180. As a result of the flexibility of the flexible member 160 connecting the fastener head 125 to the external threads 129, and the sliding fit between the flexible member 160 and the second portion 122 the operator may employ additional steps to complete the removal process. In particular, the operator can apply a tension to the flexible member 160 by pulling the winglet 180 upwardly away from the wing 170 (as indicated by arrows T), causing the stop element 140 to bear tightly against the attached second portion 133. While the flexible member 160 remains under tension, with the stop element 140 positioned tightly against the attached second portion 133, the operator can rotate the head 125 counterclockwise as indicated by arrow R1, causing the flexible member 160 to rotate counterclockwise, as indicated by arrow R2, which in turn causes the stop element 140 and the attached second portion 133 to rotate counterclockwise as indicated by arrow R3 so as to unthread the external threads 129 from the nut plate 183. In this manner, the frangible fastener 110 can be removed and replaced. This process can be used whether the second portion 122 is in two pieces (as shown in FIG. 6) or one piece (as shown in FIG. 4). To facilitate this operation, the elements making up the flexible member 160 (e.g., the strands and filaments described above) can be deliberately twisted in a direction that causes them to tighten together when the flexible member is rotated counter-clockwise. If, as may occur in some instances, the foregoing operation is not easily accomplished, the operator can clip the flexible member 160 and can remove the remaining elements of the fastener 110 by accessing the interior region 182 of the winglet 180.

Figure 7C:
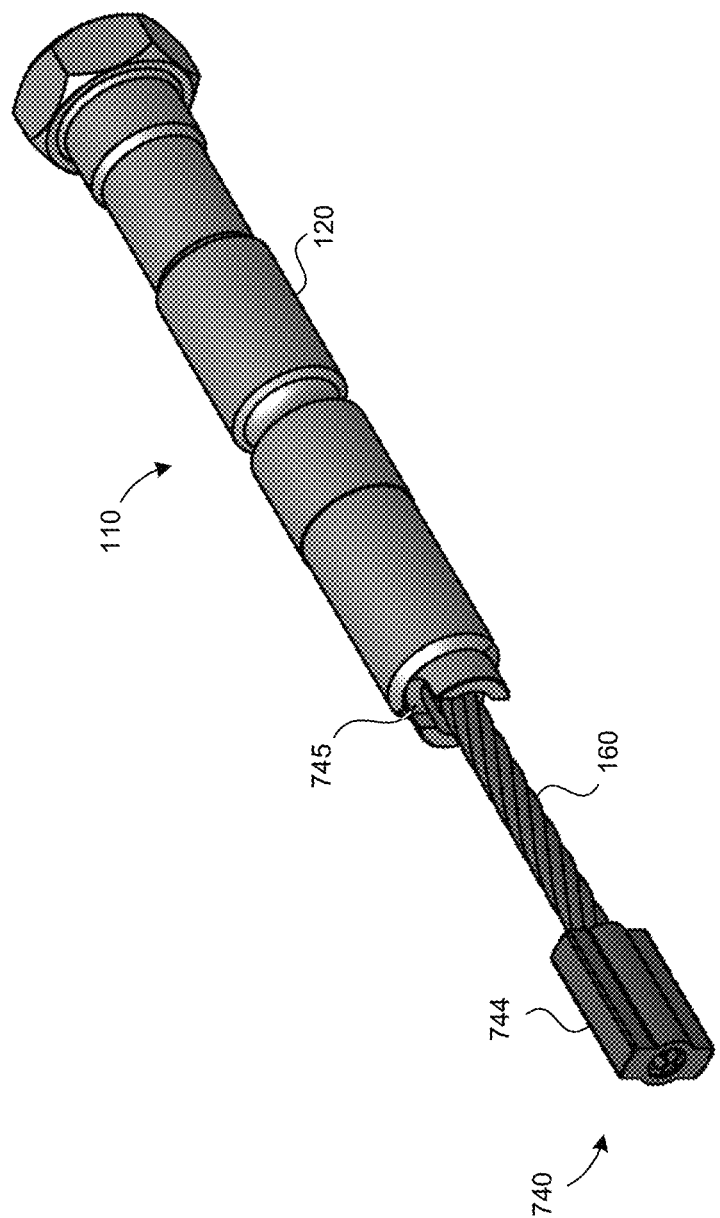
FIG. 7C is a partially schematic, isometric view of a frangible fastener having a stop element configured in accordance with some embodiments of the present technology.

As discussed above, the process of removing a broken frangible fastener 110 can be aided by tightly, snugly, or intimately engaging the stop element 140 with the attached second portion 133. FIGS. 7A-7C illustrate representative techniques for facilitating such an engagement. Beginning with FIG. 7A, a representative stop element 740 in accordance with a particular embodiment can include an inwardly tapered surface 742 facing toward the opening 126 at the second end 124 of the outer body 120. When the stop element 740 is drawn tightly against the outer body 120, the inwardly tapered surface 742 can enter the opening 126 and provide additional friction that facilitates rotating a second portion 122 in the manner described above with reference to FIG. 6.

To provide additional friction, the frangible fastener 110 can include one or more of further friction-enhancing elements. For example, the interior surfaces of the opening 126 at the second end 124 of the outer body 120 can be tapered, as shown in FIG. 7A, to provide additional contact with the correspondingly tapered surface 742 of the stop element 740. In addition to or in lieu of the foregoing feature, the stop element 740 can include ribs or other projections 743 that extend away from the tapered surface 742 and that can engage with (e.g., cut into) the surfaces of the opening 126 in the outer body 120. For example, the stop element 740 can be formed from a harder material (e.g., stainless steel) than the material forming the outer body 120 (e.g., aluminum). FIG. 7B is a cross-sectional illustration of the fastener 110, illustrating the stop element 740 with four ribs 743, in accordance with some embodiments of the present technology. In other embodiments, the stop element 740 can include other numbers of ribs 743 (e.g. 2, 3, 5) and/or other friction-enhancing features.

FIG. 7C illustrates still another representative arrangement in which the stop element 740 has been shaped (e.g., crimped or otherwise formed) to include an outwardly extending key 744. The outer body 120 can include a corresponding keyway or key slot 745 sized to receive the key 744. In operation, the operator draws the stop element 740 against the outer body 120, rotates the flexible member 160 until the key 744 drops into the keyway 745, and then continues to rotate the flexible member 160 to unscrew the second portion 722 from the component to which it is attached. In a particular aspect of this embodiment, the end of the outer body 120 in which the keyway 745 is located can be unthreaded so as to reduce or eliminate the likelihood for cross-threading the fastener 110 during installation.

Figure 8:
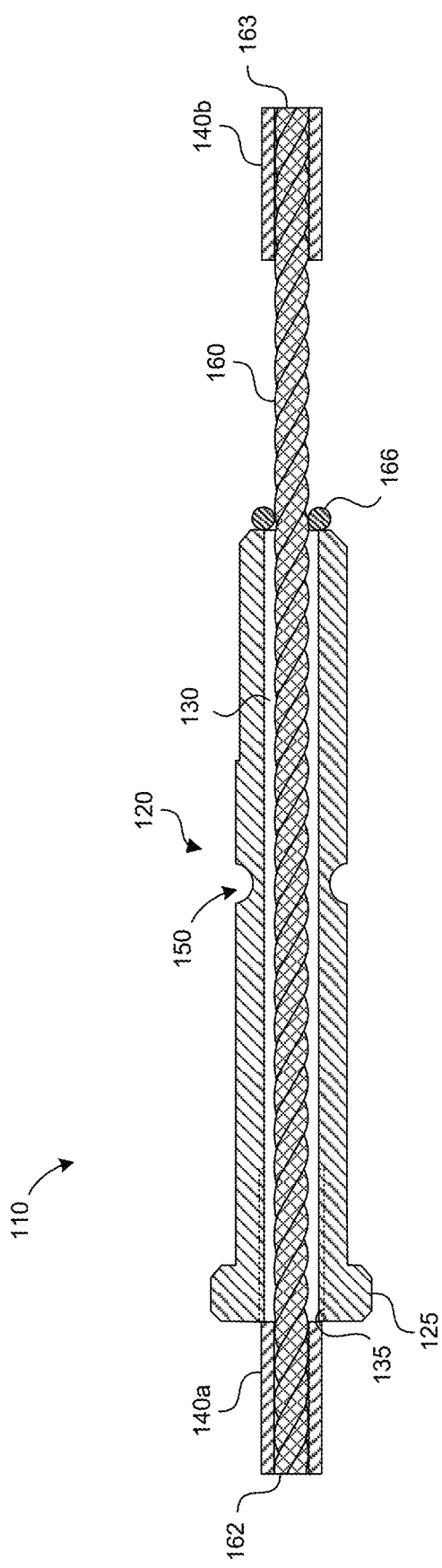
FIG. 8 is a partially schematic cross-sectional illustration of a frangible fastener having a flexible member with two stop elements in accordance with an embodiment of the present technology.

In a further representative embodiment, the flexible member 160 can include multiple stop elements 140, rather than one stop element and a crimp joint. For example, as shown in FIG. 8, the flexible member 160 can include a first stop element 140a toward the first end 162, and a second element 140b toward the second end 163. The presence of the second stop element 140b can eliminate the need for the crimp joint 141 described above. Instead, the internal cavity 130 within the outer body 120 can have a clearance fit throughout its length, relative to the flexible member 160. A potential advantage of this construction is that it eliminates the need to crimp the outer body 120. Conversely, an advantage of the arrangement described above with reference to FIGS. 2A and 2B is that the crimp joint 141 reduces or eliminates the extent to which the flexible member 160 (or the first stop element 140a) protrudes outwardly from the head 125.

In some embodiments, the frangible fastener 110 shown in FIG. 8 may be installed in an upside-down orientation, with the head 125 below the second stop element 140b. To prevent the flexible member 160 and the second stop element 140b from sliding downwardly through the cavity 130, and causing the first stop element 140a and a portion of the flexible member 160 to project further beyond the head 125, the frangible fastener 110 can include a resistance element 166. The resistance element 166 can include a rubber band, RTV silicone bead, or another flexible element positioned on or around the flexible member 160 and/or at the end of the outer body 120 to prevent the flexible member 160 from sliding downwardly under the force of gravity. When larger forces are placed on the frangible fastener 110 (e.g., the frangible portion 150 breaks), the motion of the flexible member 160 can overcome the resistance provided by the resistance element 166, to allow relative motion between the wing and winglet.

In still further embodiments, the outer body 120 can include a recess 135 into which the first stop element 140a fits. This arrangement can reduce or eliminate the extent to which the first stop element 140a extends outwardly from the head 125, so as to reduce drag and/or the likelihood for the first stop element 140a to snag foreign objects. In this embodiment, the frangible fastener 110 can also include a resistance element 166 to prevent the flexible member 160 from moving under the force of gravity, as discussed above.

Figure 9:
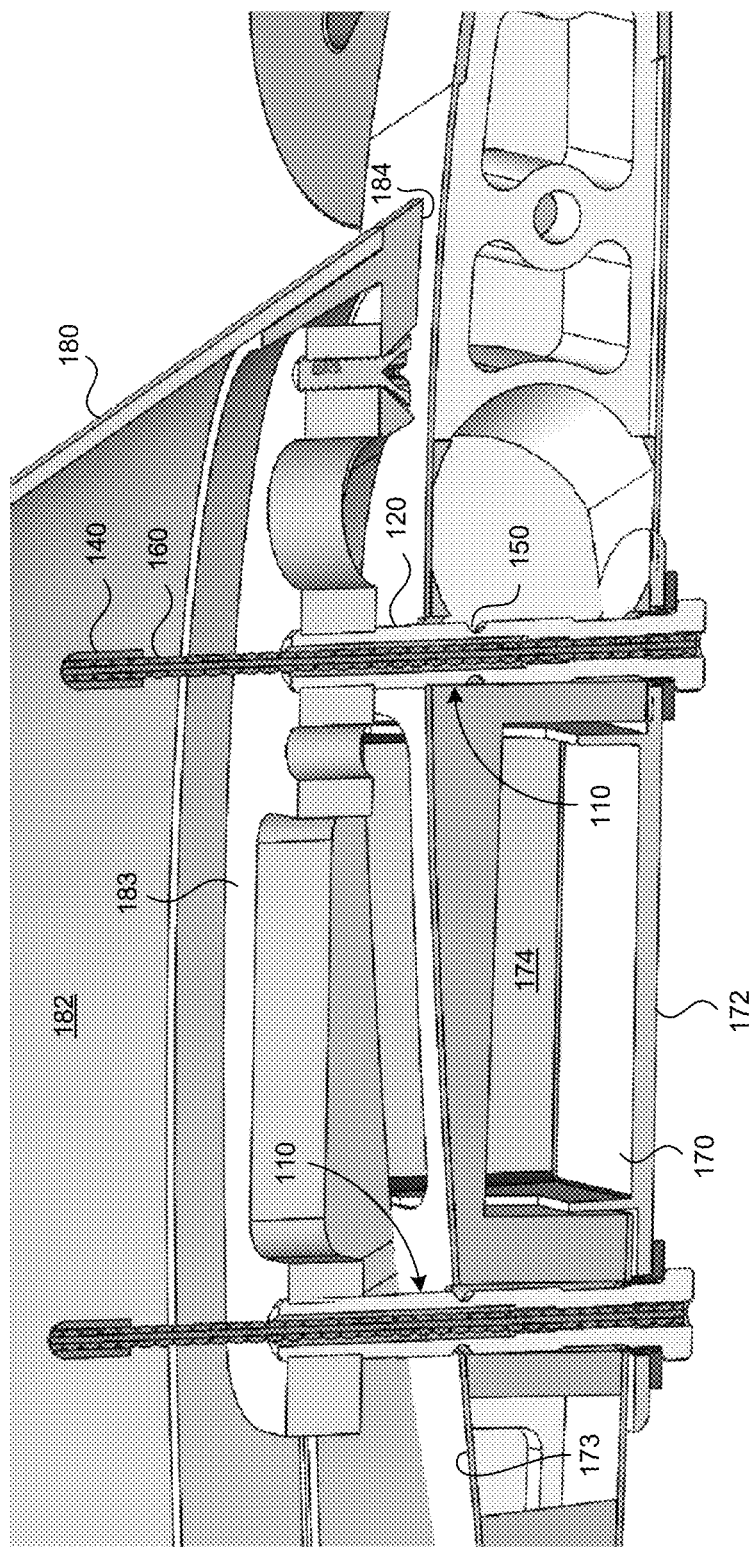
FIG. 9 is a partially schematic, isometric cut-away illustration of a wing and winglet connected with frangible fasteners in accordance with embodiments of the present technology, and taken substantially along line 9-9 of FIG. 1.

FIG. 9 is a partially schematic, partially cut-away illustration of a representative wing 170 and winglet 180 fastened with two frangible fasteners 110 in accordance with some embodiments of the present technology. As shown in FIG. 9, the nut plate 183 can extend into the interior 182 of the winglet 180 to account for the curvature of the wing upper surface 173. As is also shown in FIG. 9, the wing 170 and the winglet 180 can include access apertures that allow access to the respective interior regions 174, 182 to service these components, and if necessary, remove portions of the frangible fasteners 110 after use.

Embodiments of the present technology can provide one or more of several advantages when compared with existing frangible fasteners. For example, some existing frangible fasteners include a threaded connection between the first end of a generally rigid member (instead of a flexible member) and the outer body. If, during installation, the outer body is overtightened relative to the rigid threaded member inside, the torque can weaken the frangible portion and cause it to fail prematurely. By crimping the flexible member to the outer body at a position spaced apart from the frangible region, embodiments of the presently disclosed frangible fastener are expected to be less likely to produce such stresses at the frangible region.

Another expected advantage of embodiments that include a flexible member (when compared with a relatively non-flexible member) is that a flexible member can bend multiple times (after the frangible region breaks), without itself breaking. For example, when the frangible fastener is used to attach a winglet to wing, after the frangible region breaks, the winglet can move rapidly and repeatedly back and forth relative to the wing before coming to rest. This movement can cause a rigid attachment member to break, and thereby cause the winglet to fall completely away from the wing. By integrating a flexible member into the frangible fastener, this outcome can be avoided.

From the foregoing, it will be appreciated that specific embodiments of the present technology have been described herein for purposes of illustration, but that various modifications may be made without deviating from the technology. For example, representative frangible fasteners can be used to connect components other than a wing and a winglet. The aircraft can have configurations other than those specifically shown and described herein, for example configurations in which portions of components (e.g., fuselages, wings, and/or winglets) are blended with each other (e.g., a blended wing/body configuration). The flexible members described above can have constructions other than the stranded constructions described above, for example, a solid construction that is configured to limit breakage caused by repeated bending. Representative frangible fasteners have been shown herein with the first portion in contact with the aircraft wing, and the second portion in contact with the winglet. In other embodiments, the orientation of the frangible fastener can be reversed. The frangible portion can have a rounded or radiused cross-sectional shape, as shown in several of the Figures, or it can have a "V-shaped" or other suitably shaped cross-section.

In a particular embodiment, the outer body can be manufactured from aluminum and the flexible member from stainless steel. In other embodiments, these components can be made from other suitable materials. The surface finishes of these components (and in particular at the frangible region) can be controlled to produce consistent results.

Certain aspects of the technology described in the context of particular embodiments may be combined or eliminated in other embodiments. For example, the crimp connection between the flexible member and the outer body may be eliminated in favor of a second stop element. Further, while advantages associated with certain embodiments of the technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein.

We claim:
1. An unmanned aircraft, comprising:
a wing;
a winglet carried by the wing; and
a frangible fastener coupling the winglet to the wing, the frangible fastener including:
an outer body having a first portion terminating at a first end of the outer body and in contact with the wing, a second portion terminating at a second end of the outer body opposite the first end of the outer body and in contact with the winglet, and a frangible portion located between the first and second portions, the first portion including a head integrally formed at the first end of the outer body, the second portion including external threads;
a flexible member positioned at least partially within the outer body, the flexible member having a first end oriented toward the first end of the outer body, and a second end oriented toward the second end of the outer body, the first end of the flexible member fixedly connected to the first portion, the flexible member extending through the second portion such that the second end of the flexible member is located outside of the outer body; and
a stop element fixedly connected to the second end of the flexible member and spaced apart from the second end of the outer body, the stop element being configured to contact the second end of the outer body when the second portion separates from the first portion in response to the frangible portion breaking.

2. The aircraft of claim 1, wherein the first portion is crimped to the flexible member.

3. The aircraft of claim 1, wherein the flexible member includes a cable.

4. The aircraft of claim 1, wherein the flexible member includes a solid wire.

5. The aircraft of claim 1, wherein the stop element is crimped to the flexible member.

6. The aircraft of claim 1, wherein the outer body has a hollow internal cavity with an opening located at the second end of the outer body, and wherein the flexible member includes a cable positioned within the hollow cavity, the cable extending through the opening and away from the second end of the outer body, the stop element having an outer diameter that is larger than an inner diameter of the opening.

7. The aircraft of claim 6, wherein the cable has an outer diameter that is less than the outer diameter of the stop element.

8. The aircraft of claim 1, wherein an outer diameter of the first portion is greater than an outer diameter of the frangible portion.

9. The aircraft of claim 1, wherein the winglet includes an internally threaded aperture, and wherein the external threads of the second portion of the frangible fastener are threadably received in the internally threaded aperture.

10. The aircraft of claim 1, wherein the second portion is configured to slide along the flexible member between the first portion and the stop element when the second portion is separated from the first portion in response to the frangible portion breaking.

11. The aircraft of claim 1, wherein the winglet includes an interior region, the second end of the flexible member being located within the interior region.

12. The aircraft of claim 1, wherein the winglet includes an internally threaded aperture, the external threads of the second portion of the frangible fastener being threadably received in the internally threaded aperture.

13. The aircraft of claim 12, wherein the winglet includes a nut plate located within an interior region of the winglet, the nut plate including the internally threaded aperture.

14. A frangible fastener for coupling a first component to a second component, the frangible fastener comprising:
an outer body having:
a first portion terminating at a first end of the outer body, the first portion including a head integrally formed at the first end of the outer body and positionable to contact the first component;
a second portion terminating at a second end of the outer body opposite the first end of the outer body, the second portion including external threads positionable to contact the second component; and
a frangible portion located between the first and second portions;
a flexible member positioned at least partially within the outer body, the flexible member having a first end oriented toward the first end of the outer body, and a second end oriented toward the second end of the outer body, the first end of the flexible member fixedly connected to the first portion, the flexible member extending through the second portion such that the second end of the flexible member is located outside of the outer body; and
a stop element fixedly connected to the second end of the flexible member and spaced apart from the second end of the outer body, the stop element being configured to contact the second end of the outer body when the second portion separates from the first portion in response to the frangible portion breaking.

15. The frangible fastener of claim 14, wherein the first portion is crimped to the flexible member.

16. The frangible fastener of claim 14, wherein the flexible member includes a cable.

17. The frangible fastener of claim 16, wherein the stop element is crimped to the cable.

18. The frangible fastener of claim 14, wherein the outer body includes an opening through which the flexible member extends, and wherein the stop element includes a tapered portion configured to slideably enter the opening when the second portion separates from the first portion in response to the frangible portion breaking.

19. The frangible fastener of claim 14, wherein the outer body includes an opening through which the flexible member extends, and wherein the stop element includes a tapered edge configured to cut into the outer body around the opening when the second portion separates from the first portion in response to the frangible portion breaking.

20. The frangible fastener of claim 14, wherein the outer body includes an opening through which the flexible member extends, the opening having a key slot, and wherein the stop element includes a key positioned to slideably enter the key slot when the second portion separates from the first portion in response to the frangible portion breaking.

21. The frangible fastener of claim 14, wherein the outer body has a hollow internal cavity with an opening located at the second end of the outer body, and wherein the flexible member includes a cable positioned within the hollow cavity, the cable extending through the opening and away from the second end of the outer body, the stop element being having an outer diameter that is larger than an inner diameter of the opening.

22. The frangible fastener of claim 14, wherein an outer diameter of the first portion is greater than an outer diameter of the frangible portion.

23. A method for manufacturing an unmanned aircraft, the method comprising:
attaching a first component of the unmanned aircraft to a second component of the unmanned aircraft with a frangible fastener, the frangible fastener including:
an outer body having a first portion terminating at a first end of the outer body, a second portion terminating at a second end of the outer body opposite the first end of the outer body, and a frangible portion located between the first and second portions, the first portion including a head integrally formed at the first end of the outer body, the second portion including external threads;

a flexible member positioned at least partially within the outer body, the flexible member having a first end oriented toward the first end of the outer body, and a second end oriented toward the second end of the outer body, the first end of the flexible member fixedly connected to the first portion, the second end of the flexible member extending through the second portion such that the second end of the flexible member is located outside of the outer body; and a stop element fixedly connected to the second end of the flexible member and spaced apart from the second end of the outer body, the stop element being configured to contact the second end of the outer body when the second portion separates from the first portion in response to the frangible portion breaking; and wherein attaching the first aircraft component to the second aircraft component includes:

threadably engaging the second portion of the outer body to the second aircraft component; and operably engaging the first portion of the outer body with the first aircraft component.

24. The method of claim 23, wherein threadably engaging the second portion of the outer body to the second aircraft component includes positioning the second end of the flexible member within an interior region of the second aircraft component.

25. The method of claim 23, wherein operably engaging the first portion of the outer body with the first aircraft component includes contacting the head of the first portion of the outer body with a surface of the first aircraft component.

26. The method of claim 23, wherein operably engaging the first portion of the outer body with the first aircraft component includes contacting the head of the first portion of the outer body with a washer, and contacting the washer with a surface of the first aircraft component.

27. The method of claim 23, wherein the first aircraft component includes an aircraft wing.

28. The method of claim 23, wherein the second aircraft component includes a winglet.

29. A method for operating an unmanned aircraft, the method comprising:

launching the unmanned aircraft, the unmanned aircraft having a first component and a second component connected to the first component with a frangible fastener, the frangible fastener including:

an outer body having a first portion terminating at a first end of the outer body, a second portion terminating at a second end of the outer body opposite the first end of the outer body, and a frangible portion located between the first and second portions, the first portion including a head integrally formed at the first end of the outer body, the second portion including external threads, the first portion being operably engaged to the first component, the second portion being threadably engaged to the second component;

a flexible member positioned at least partially within the outer body, the flexible member having a first end oriented toward the first end of the outer body, and a second end oriented toward the second end of the outer body, the first end of the flexible member fixedly connected to the first portion, the second end of the flexible member extending through the second portion such that the second end of the flexible member is located outside of the outer body; and a stop element fixedly connected to the second end of the flexible member and spaced apart from the second end of the outer body, the stop element being configured to contact the second end of the outer body when the second portion separates from the first portion in response to the frangible portion breaking; and placing a load on the unmanned aircraft, the load breaking the frangible portion, the first component remaining connected to the second component by the flexible member following the breaking of the frangible portion, the flexible member allowing movement of the first component relative to the second component following the breaking of the frangible portion, the movement being limited by the stop element.

30. The method of claim 29, wherein the stop element does not limit the movement of the first component relative to the second component prior to the breaking of the frangible portion.

31. The method of claim 29, wherein placing the load on the unmanned aircraft includes contacting the unmanned aircraft with a capture line, and releasably securing the unmanned aircraft to the capture line.

32. The method of claim 29, wherein the frangible fastener is a first frangible fastener, and wherein the method further comprises:

detaching the second component from the first component by removing the first frangible fastener following the breaking of the frangible portion of the first frangible fastener; and re-attaching the second component to the first component with a second frangible fastener.

33. The method of claim 29, wherein the method further comprises removing the frangible fastener by:

placing tension on the flexible member to draw the stop element into contact with the second end of the outer body; and rotating the first portion, while the flexible member is under tension, to unthread the second portion from the second component.

* * * * *